Sept. 6, 1955 P. ZALM ET AL 2,717,244
LUMINESCENT MATERIAL
Filed Jan. 14, 1953
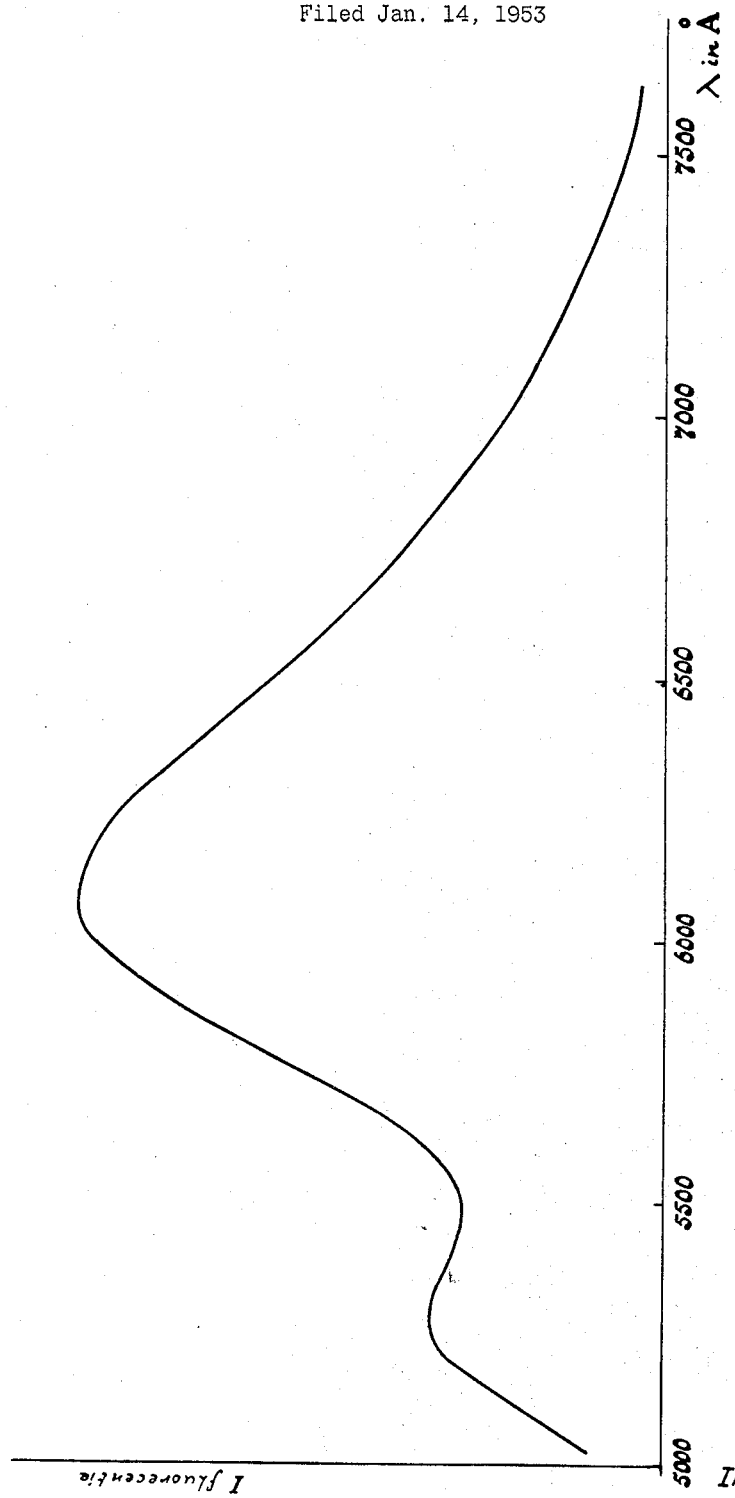
Inventors
Pieter Zalm
Jan van den Boomgaard
By
Agent

United States Patent Office 2,717,244
Patented Sept. 6, 1955

2,717,244

LUMINESCENT MATERIAL

Pieter Zalm and Jan van den Boomgaard, Eindhoven, Netherlands, assignors to Hartford National Bank and Trust Company, Hartford, Conn., as trustee Application January 14, 1953, Serial No. 331,188

Claims priority, application Netherlands January 15, 1952

3 Claims. (Cl. 252—301.6)

This invention relates to luminescent materials and to a method of manufacturing same, more particularly, to luminescent materials which luminesce in the orange and yellow regions of the visible spectrum upon excitation.

One of the more commonly known and readily available luminescent materials is willemite, which is zinc orthosilicate activated with manganese. This material exhibits green luminescence upon both excitation by corpuscular particles, for example, electrons, and excitation by electromagnetic radiation, for example, ultraviolet or X-rays. However, it has heretofore been impossible to produce a luminescent material containing willemite which luminesces in the orange-yellow region of the visible spectrum between 6000 and 6200 Å. with satisfactory efficiency at room temperature, a highly desirable and extremely useful material particularly for use as screens in cathode-ray tubes, and in gas-discharge tubes, and the like. The main object of the invention is to provide a luminescent material luminescing in the orange-yellow region of the visible spectrum with a maximum between 6000 and 6200 Å. and having a high efficiency and stable emission at room temperature. This and further objects of the invention will be best understood from the following description.

It has been found that a luminescent manganese activated zinc-phosphato-silicate, which luminesces in the orange-yellow region can be produced by adding phosphorus or a phosphorus containing compound to the starting constituents, which, without said addition would produce the green luminescent willemite and by employing such proportions of these starting constituents that the resulting product has the general formula:

$$a\text{ZnO}.b\text{SiO}_2.c\text{P}_2\text{O}_5.d\text{MnO}$$

wherein $a:b$ lies between 2.2:1 and 1:1,
$d:a$ lies between 1:200 and 1:5 and
$c:a$ lies between 1:400 and 1:10

A luminescent material fulfilling the above requirements will exhibit an emission characteristic having a peak between 6000 and 6200 Å., and the emission therefrom will be stable at room temperature.

The luminescent material according to the invention is preferably manufactured by adding ammonium phosphate either to a mixture of zinc oxide, silicon dioxide and manganese oxide, or to a mixture of compounds from which these oxides may readily be obtained by decomposition during heating, for example carbonates or nitrates, and by heating the whole mixture at an elevated temperature between 700 and 875° C. in a reducing atmosphere containing water vapor.

A compound in accordance with the invention having a very satisfactory light output in the yellow-orange region has the formula: $2\text{ZnO}.1\text{SiO}_2.0.03\text{P}_2\text{O}_5:0.05\text{MnO}$. This material may be manufactured as described in Example I, below:

Example I 2.03 gs. of ZnO are mixed in water with 0.75 g. of $\text{SiO}_2$, 0.15 g. of $\text{MnSiO}_3$ and 0.15 g. of $(\text{NH}_4)_2\text{HPO}_4$. The resultant suspension is ground in a ball-mill and dried by vaporisation at a temperature of about 100° C. The dry substance is intimately mixed and heated at about 800° C. for about 1½ hours in an atmosphere of steam and hydrogen. The resultant product has an emission curve upon excitation by electrons such as shown in the accompanying drawing.

Further examples of compounds made in accordance with the invention are as follows:

Example II

A substance with the formula $$1.2\text{ZnO}.1\text{SiO}_2.0.008\text{P}_2\text{O}_5.0.008\text{MnO}$$

may be prepared as follows:

9.75 gs. of ZnO are mixed in water with 6 gs. of $\text{SiO}_2$, 0.22 g. of $(\text{NH}_4)_2\text{HPO}_4$ and 0.1 g. of $\text{MnCO}_3$. The resultant suspension is ground in a ball mill and dried by vaporisation at a temperature of about 100° C. The dry substance is intimately mixed and heated at about 800° C. for about 1½ hours in an atmosphere of steam and hydrogen. The resultant product has an emission curve upon excitation of electrons, which is almost identical with that shown in the accompanying drawing.

Example III

Another substance according to the invention has the following ratios:

$a:b=2.15:1$
$d:a=1:30$
$c:a=1:30$

This substance may be prepared as follows:

17.5 gs. of ZnO are mixed in water with 6 gs. of $\text{SiO}_2$, 1.9 gs. of $(\text{NH}_4)_2\text{HPO}_4$ and 0.825 g. of $\text{MnCO}_3$. The resultant suspension is ground in a ball mill and dried by vaporisation at a temperature of about 100° C. The dry substance is intimately mixed and heated at about 800° C. for about 1½ hours in an atmosphere of steam and hydrogen. The resultant product has an emission curve upon excitation of electrons, which is almost identical with that shown in the accompanying drawing.

Example IV

Another substance according to the invention has the following ratios:

$a:b=3:2$
$d:a=1:60$
$c:a=1:80$

This substance may be prepared as follows:

12.2 gs. of ZnO are mixed in water with 6 gs. of $\text{SiO}_2$, 0.5 g. of $(\text{NH}_4)_2\text{HPO}_4$ and 0.285 g. of $\text{MnCO}_3$. The resultant suspension is ground in a ball mill and dried by vaporisation at a temperature of about 100° C. The dry substance is intimately mixed and heated at about 800° C. for about 1½ hours in an atmosphere of steam and hydrogen. The resultant product has an emission curve upon excitation of electrons, which is almost identical with that shown in the accompanying drawing.

It is evident that a luminescent screen according to the invention may contain other luminescent materials in addition to the described zinc-phosphato-silicate activated with manganese. Said materials may exhibit an emission either in the same part of the spectrum or in other parts thereof.

While we have thus described our invention with specific examples and embodiments thereof, other modifications will be readily apparent to those skilled in the art without

What is claimed is:

1. A luminescent manganese-activated zinc-phosphato-silicate with a peak emission between 6000 and 6200 Å. and being stable at room temperature having the general formula:

$$a\text{ZnO} \cdot b\text{SiO}_2 \cdot c\text{P}_2\text{O}_5 \cdot d\text{MnO}$$

wherein $a:b$ lies between 2.2:1 and 1:1,
$d:a$ lies between 1:200 and 1:5 and
$c:a$ lies between 1:400 and 1:10

2. A luminescent material having a peak emission between 6000 and 6200 Å. and being stable at room temperature, said material having the chemical formula $2\text{ZnO} \cdot 1\text{SiO}_2 \cdot 0.03\text{P}_2\text{O}_5 : 0.05\text{MnO}$.

3. A method of preparing a luminescent material having a peak emission between 6000 and 6200 Å. comprising the steps, mixing ZnO, SiO₂MnO and (NH₄)₂HPO₄ in amounts sufficient to produce upon subsequent heating a composition having the formula $$a\text{ZnO} \cdot b\text{SiO}_2 \cdot c\text{P}_2\text{O}_5 \cdot d\text{MnO}$$

the ratio $a:b$ being between 2.2:1 and 1:1, the ratio $d:a$ being between 1:200 and 1:5 and the ratio $c:a$ being between 1:400 and 1:10, and heating the mixture at about 700 to 875° C. in a reducing atmosphere containing water-vapor.

References Cited in the file of this patent

UNITED STATES PATENTS

| | | |
|---|---|---|
| 2,195,341 | Randall | Mar. 26, 1940 |

FOREIGN PATENTS

| | | |
|---|---|---|
| 692,394 | Germany | May 23, 1940 |
| 660,096 | Great Britain | Oct. 31, 1951 |